United States Patent [19]

Kondo

[11] Patent Number: 5,272,539
[45] Date of Patent: Dec. 21, 1993

[54] VIDEO CAMERA WITH FLICKER CANCELLATION

[75] Inventor: Toshiharu Kondo, Kanagawa, Japan

[73] Assignee: Sony Corporation, Tokyo, Japan

[21] Appl. No.: 804,053

[22] Filed: Dec. 9, 1991

[30] Foreign Application Priority Data

Dec. 22, 1990 [JP] Japan ............................ 2-413327

[51] Int. Cl.$^5$ .................... H04N 5/238; H04N 5/52
[52] U.S. Cl. ........................ 358/228; 358/213.18; 358/174
[58] Field of Search ............ 358/228, 213.18, 213.19, 358/209, 909, 174, 167

[56] References Cited

U.S. PATENT DOCUMENTS

| | | | |
|---|---|---|---|
| 4,495,520 | 1/1985 | Kravitz et al. | 358/174 |
| 4,631,582 | 12/1986 | Nagasaki et al. | 358/174 |
| 4,670,787 | 6/1987 | Levine | 358/174 |
| 4,918,538 | 4/1990 | Saito et al. | 358/228 |
| 4,989,093 | 1/1991 | Kaneko | 358/213.19 |
| 5,053,871 | 10/1991 | Ogawa et al. | 358/228 |
| 5,053,877 | 10/1991 | Kondo et al. | 358/228 |
| 5,065,248 | 11/1991 | Homma | 358/228 |
| 5,128,769 | 7/1992 | Arai et al. | 358/228 |
| 5,162,913 | 11/1992 | Chatenever et al. | 358/213.19 |

*Primary Examiner*—Michael T. Razavi
*Assistant Examiner*—Wendy R. Greening
*Attorney, Agent, or Firm*—Lewis H. Eslinger; Jay H. Maioli

[57] ABSTRACT

An exposure correcting loop detects an image pickup signal level and controls a gain of an AGC amplifier and/or an opening of an iris in accordance with the image pickup signal level. A flicker cancelling loop has a flicker detector and detects a flicker component level in the image pickup signal and controls the gain of the AGC amplifier and/or the opening of the iris so that the flicker component level is cancelled. The exposure correcting loop and flicker detector are independent systems.

8 Claims, 4 Drawing Sheets

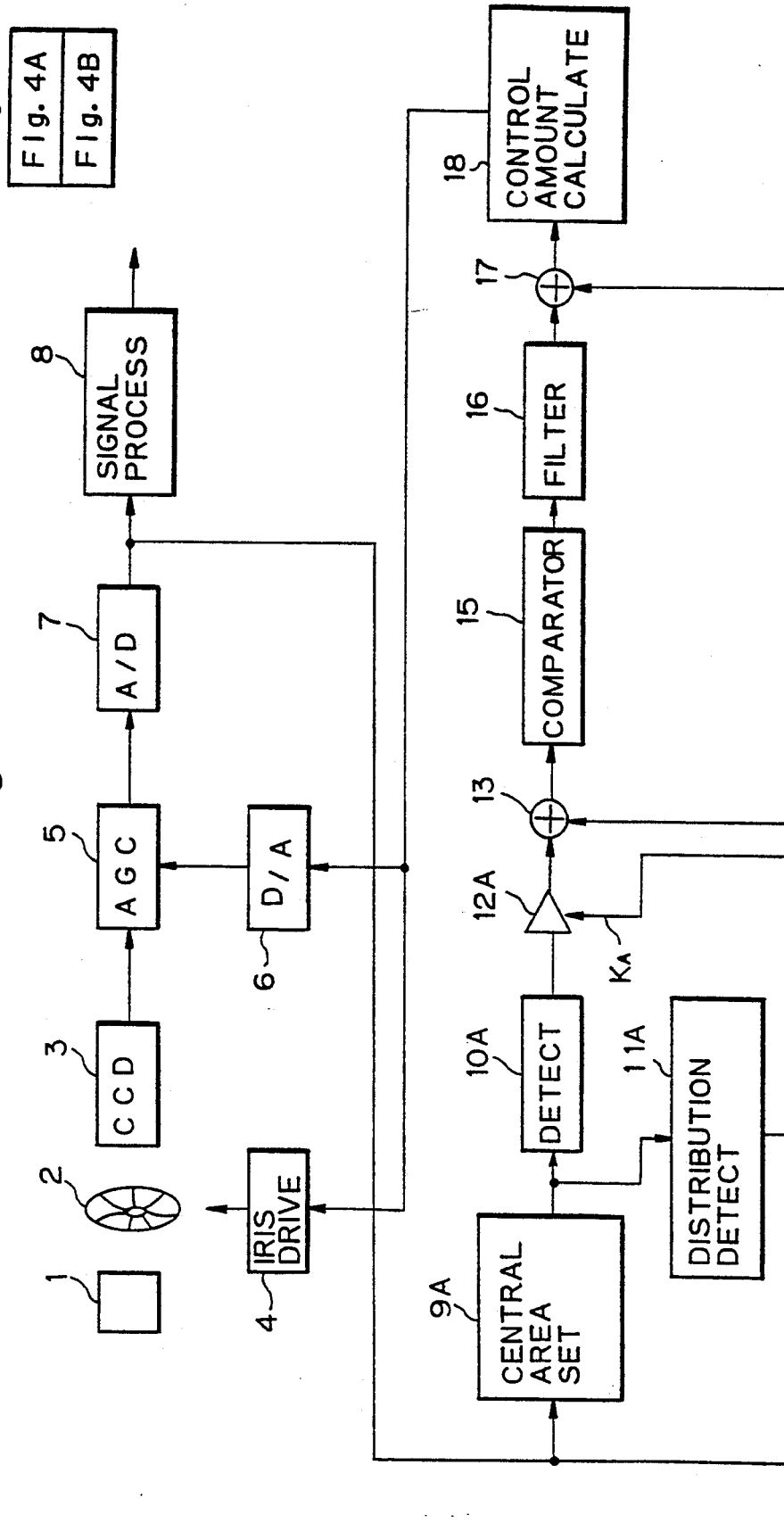

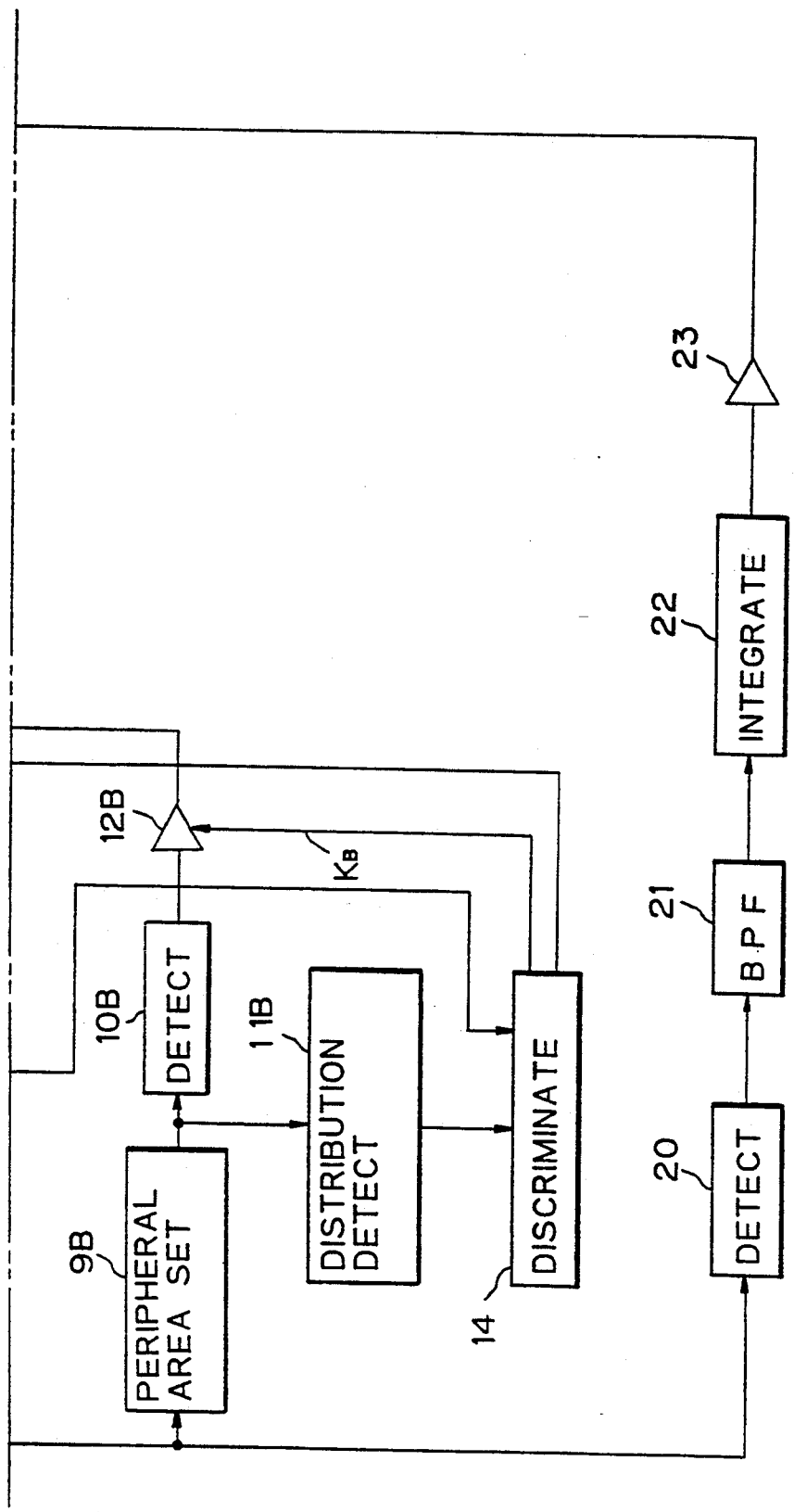

VIDEO CAMERA WITH FLICKER CANCELLATION

BACKGROUND OF THE INVENTION

1. Field of the Invention

The invention relates to a video camera apparatus and, more particularly, to the elimination of flickers which are generated when an object is photographed under a fluorescent lamp.

2. Description of the Prior Art

For instance, when an object is video photographed by a video camera of the NTSC system under a fluorescent lamp which is lit on by a commercially available power source of a frequency of 50 Hz, flickers of a frequency of 20 Hz are generated due to the relation between the field frequency and the lighting frequency of the fluorescent lamp. To eliminate such flicker components, there is proposed a flicker cancelling circuit for detecting the flicker components of a frequency of 20 Hz in an image pickup signal and for variably changing a gain of an AGC so as to cancel the flicker components.

That is, FIG. 1 shows an example of a flicker cancelling circuit of a conventional video camera. In FIG. 1, an object image transmitted through a lens 51 is formed onto a CCD image pickup device 53 through an iris 52. An output of the CCD image pickup device 53 is supplied to an AGC amplifier 54. An output of the AGC amplifier 54 is supplied to a signal processing circuit 55 and to a detecting circuit 56.

The level of image pickup signal is detected by the detecting circuit 56. An output of the detecting circuit 56 is supplied to a comparator 57 and to a band pass filter 58 of a frequency of 20 Hz. A predetermined reference level is set into the comparator 57. The image pickup signal level is compared with the predetermined reference level by the comparator 57. An output of the comparator 57 is supplied to an adding circuit 60 through a loop filter 59. An output of the adding circuit 60 is supplied to the AGC amplifier 54. The gain of the AGC amplifier 54 is controlled in accordance with the output of the adding circuit 60. The output of the detecting circuit 56 is compared with the predetermined reference level by the comparator 57. The image pickup signal level is controlled so as to become the predetermined reference level by a loop for controlling the gain of the AGC amplifier 54 by an output of the comparator 57.

The component of a frequency of 20 Hz in the image pickup signal is detected by the band pass filter 58. An output of the band pass filter 58 is supplied to the adding circuit 60 through a filter 61 and a gain amplifier 62. The flicker components of the frequency of 20 Hz in the output of the detecting circuit 56 are extracted by the band pass filter 58. The flicker components of the frequency of 20 Hz are cancelled by a loop for controlling the gain of the AGC amplifier 54 by the flicker components.

That is, in the above circuit, as shown in FIG. 2, AGC loop gain characteristics such as to increase the gain of the portion of the frequency of 20 Hz are set. In FIG. 2, an axis of abscissa denotes the frequency and an axis of ordinate indicates the gain. The flicker components of the frequency of 20 Hz are cancelled by setting such loop gain characteristics.

In the flicker cancelling circuit of the conventional video camera shown in FIG. 1, however, the exposure control loop for controlling such that the image pickup signal level is set to the predetermined reference level and the flicker cancelling loop for controlling such that the flicker components of the frequency of 20 Hz are extracted and the flicker components are cancelled are constructed by using the same detecting circuit 56. Therefore, for instance, when weight amounts of an exposure detection area in the central portion and an exposure detection area in the peripheral portion are changed at the time of a backlight, there occurs a problem such that the flicker cancelling characteristics also change.

Namely, in the case of the backlight, the iris is closed and the gain of the AGC amplifier is reduced, so that the object becomes dark. As shown in FIG. 3, therefore, exposure detection areas A1 and A2 are provided for the central portion and peripheral portion of the picture plane, respectively. The weight of the image pickup signal level of the exposure detection area A1 in the central portion of the picture plane is set to a large value in the backlight state, thereby controlling so as to execute the center significance photometric operation. Consequently, it is possible to prevent that the object becomes dark. In the case where the exposure control loop and the flicker cancelling loop are constructed by using the same detecting circuit 56, there occurs a problem such that the flicker cancelling characteristics also change when the weight amounts of the exposure detection area A1 of the central portion and the exposure detection area A2 of the peripheral portion are changed in accordance with whether the light is a back light or a front light.

OBJECTS AND SUMMARY OF THE INVENTION

It is, therefore, an object of the invention to provide a video camera which can make flicker cancelling characteristics constant.

According to the invention, there is provided a video camera apparatus characterized in that an exposure correcting loop for detecting an image pickup signal level and for controlling a gain of an AGC amplifier and/or an opening degree of an iris in accordance with the image pickup signal level and a flicker cancelling loop for detecting a flicker component level in the image pickup signal and for controlling the gain of the AGC amplifier and/or the opening degree of the iris so that the flicker component level is cancelled are respectively independently provided.

The above and other objects, features, and advantages of the present invention will become readily apparent from the following detailed description thereof which is to be read in connection with the accompanying drawings.

BRIEF DESCRIPTION OF THE DRAWINGS

FIGS. 4a and 4b are block diagrams of an embodiment of the invention.

DETAILED DESCRIPTION OF THE PREFERRED EMBODIMENT

Figure 1:
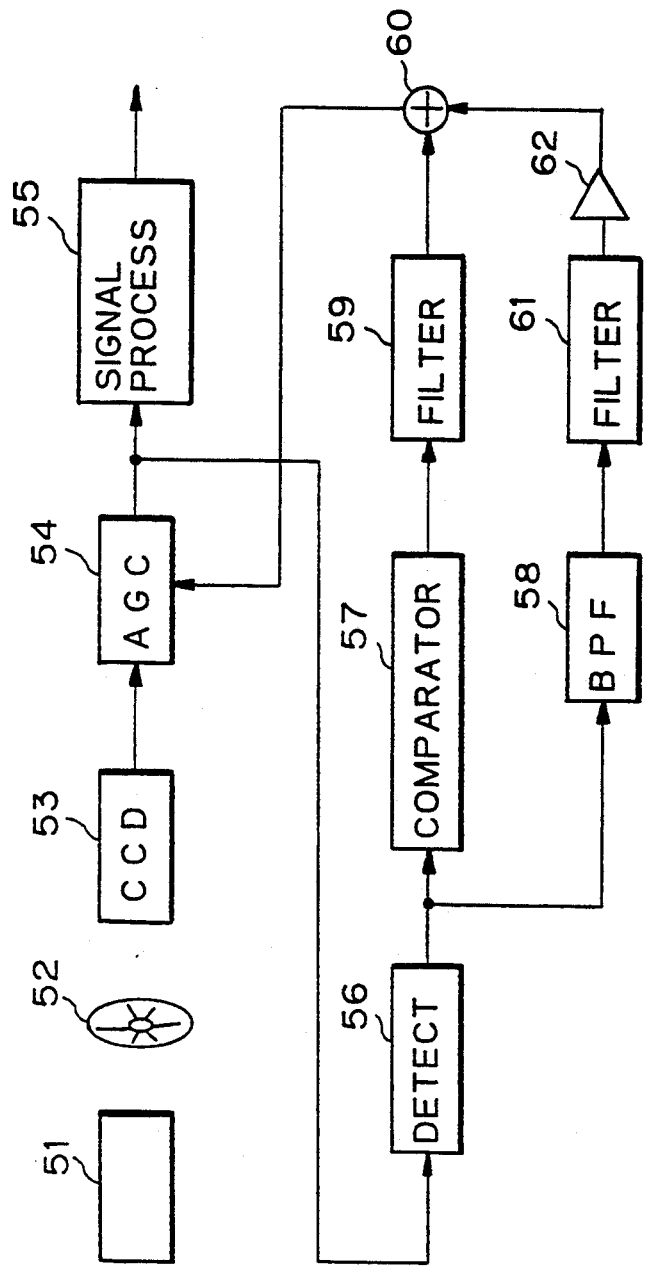
FIG. 1 is a block diagram which is used to explain a flicker cancelling circuit of a conventional video camera.
Figure 2:
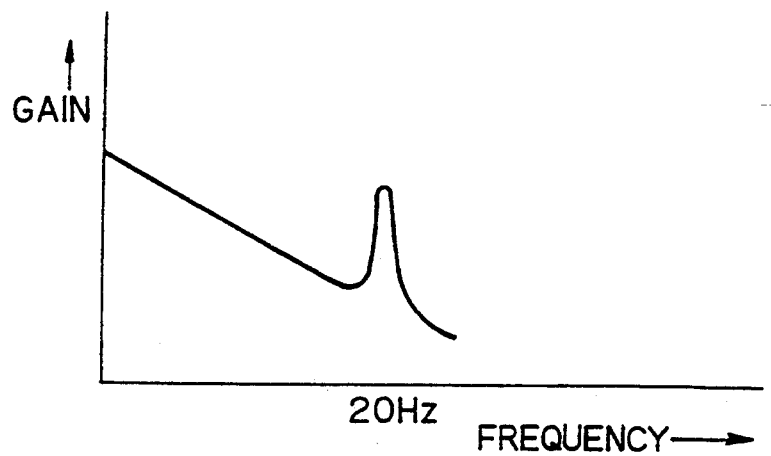
FIG. 2 is a graph which is used to explain the flicker cancelling circuit of the conventional video camera.
Figure 3:
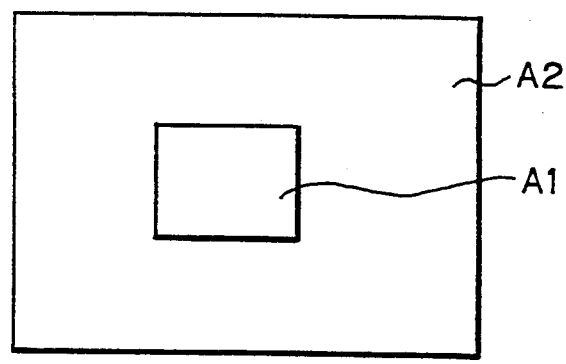
FIG. 3 is a schematic diagram which is used to explain the flicker cancelling circuit of the conventional video camera.

FIG. 4 is a block diagram of an embodiment of the invention. In FIG. 4, an object image transmitted through a lens 1 is formed onto a photo sensitive surface of a CCD image pickup device 3 through an iris 2. The opening/closing operation of the iris 2 is controlled by an iris driving circuit 4. An output of the CCD image pickup device 3 is supplied to an AGC amplifier 5. A gain of the AGC amplifier 5 is set in accordance with an output of a D/A converter 6. An output of the AGC amplifier 5 is supplied to an A/D converter 7. An image pickup signal is converted into a digital signal by the A/D converter 7. The digital image pickup signal is supplied to a signal processing circuit 8, a central area setting circuit 9A, and a peripheral area setting circuit 9B. The output of the A/D converter 7 is also supplied to a detecting circuit 20.

The central area setting circuit 9A is a gate circuit to set an exposure detection area of almost the central portion of a picture plane. An output of the central area setting circuit 9A is supplied to a detecting circuit 10A and a distribution detecting circuit 11A. The detecting circuit 10A detects the image pickup signal level in the exposure detection area of almost the central portion of the picture plane. An output of the detecting circuit 10A is supplied to an adding circuit 13 through a multiplying circuit 12A.

The peripheral area setting circuit 9B is a gate circuit to set an exposure detection area of the peripheral portion of the picture plane. An output of the peripheral area setting circuit 9B is supplied to a detecting circuit 10B and a distribution detecting circuit 11B. The detecting circuit 10B detects the image pickup signal level in the exposure detection area of the peripheral portion of the picture plane. An output of the detecting circuit 10B is supplied to the adding circuit 13 through a multiplying circuit 12B.

The distribution detecting circuit 11A counts the number of samples whose levels are equal to or higher than a predetermined level in the image pickup signal level in the exposure detection area of almost the central portion of the picture plane. The distribution detecting circuit 11B counts the number of samples whose levels are equal to or higher than a predetermined level in the image pickup signal level in the exposure detection area of the peripheral portion of the picture plane. A luminance distribution state of the picture plane can be detected from outputs of the distribution detecting circuits 11A and 11B and a backlight state can be judged. That is, in the case of the front light, the luminance levels of the picture plane are almost uniform, so that the outputs of the distribution detecting circuits 11A and 11B are almost equal. In the backlight state, since the background is remarkably bright, the output of the distribution detecting circuit 11B is larger than the output of the distribution detecting circuit 11A.

The outputs of the distribution detecting circuits 11A and 11B are supplied to a discriminating circuit 14. The discriminating circuit 14 discriminates whether the light is a backlight or not on the basis of the outputs of the distribution detecting circuits 11A and 11B. In accordance with the result of the judgment about the backlight state, a weight coefficient $K_A$ of the exposure detection area of almost the central portion of the picture plane and a weight coefficient $K_B$ of the exposure detection area of the peripheral portion of the picture plane are respectively determined. The weight coefficients $K_A$ and $K_B$ are supplied to the multiplying circuits 12A and 12B, respectively.

The image pickup signal level of the exposure detection area of almost the central portion of the picture plane and the image pickup signal level in the exposure detection area of the peripheral portion of the picture plane are weighted and added by the multiplying circuits 12A and 12B and the adding circuit 13. An output of the adding circuit 13 is supplied to a comparator 15. A predetermined reference level is set into the comparator 15. The comparator 15 compares the level of the image pickup signal which is generated from the adding circuit 13 and the predetermined reference level. A comparison output of the comparator 15 is supplied to an adding circuit 17 through a loop filter 16.

An output of the adding circuit 17 is supplied to a control amount calculating circuit 18. The control amount calculating circuit 18 calculates an opening degree of the iris 2 and the gain of the AGC amplifier 5 in accordance with the image pickup signal level. An output of the control amount calculating circuit 18 is supplied to the iris driving circuit 4 and the D/A converter 6. Thus, the image pickup signal level is controlled so as to become the predetermined reference level.

The image pickup signal level of the whole image pickup picture plane is detected by the detecting circuit 20. An output of the detecting circuit 20 is supplied to a band pass filter 21 of a frequency of 20 Hz. Flicker components of the frequency of 20 Hz are extracted by the band pass filter 21. An output of the band pass filter 21 is supplied to the adding circuit 17 through an integrating circuit 22 and a gain amplifier 23. Thus, the flicker components of the frequency of 20 Hz included in the image pickup signal are cancelled.

According to the invention, the detecting circuits 10A and 10B included in the exposure control loop and the detecting circuit 20 included in the flicker cancelling loop are respectively independently constructed. Thus, the flicker cancelling characteristics can be always made constant. Even when the weight coefficients $K_A$ and $K_B$ for the exposure detection area of almost the central portion and the exposure detection area of the peripheral portion are respectively changed in accordance with whether the light is the backlight or the front light, no influence is exerted on the flicker cancelling characteristics.

Having described a specific preferred embodiment of the present invention with reference to the accompanying drawings, it is to be understood that the invention is not limited to the precise embodiment, and that various changes and modifications may be effected therein by one skilled in the art without departing from the scope or the spirit of the invention as defined in the appended claims.

What is claimed is:

1. A video camera apparatus comprising:
   an image pickup device;
   an exposure control loop connected to an output of said image pickup device and including a first image pickup signal level detecting means, comparing means for comparing the image pickup signal level and a reference level, signal combining means receiving at one input an output of said comparing means, and means for controlling a gain of an AGC amplifier and/or an opening of an iris in accordance with an output of the signal combining means; and a flicker cancelling loop connected to said output of said image pickup device and including a second image pickup signal level detecting means and a flicker component filter connected to an output thereof for detecting a flicker component level in the image pickup output signal and producing a flicker cancellation signal fed to another input of said signal combining means, said means for controlling the gain of the AGC amplifier and/or the opening of the iris outputting a control signal from which the flicker component level is cancelled, wherein said exposure control loop and said flicker cancelling loop are independent systems.

2. An apparatus according to claim 1, wherein said flicker cancelling loop comprises a band pass filter having a pass band corresponding to a frequency of flicker components which is determined by the relation between a frequency of a commercially available power source and a field frequency of a television system.

3. An apparatus according to claim 1, wherein said second image pickup signal level detecting means detects the flicker component level by using the image pickup signal of a whole image pickup picture plane.

4. A video camera apparatus comprising:

an image pickup device;

an exposure control loop connected to an output of said image pickup device and including means for setting a first exposure detection area into a central portion of a picture plane, means for setting a second exposure detection area into a peripheral portion of the picture plane, weighting and adding means for weighting and adding an image pickup output signal level detected by a first signal level detector in the first exposure detection area and an image pickup output signal level detected by a second signal level detector in the second exposure detection area, control means for assigning weight coefficients in accordance with a back-light state and a front-light state, comparing means for comparing an output of the weighting and adding means with a reference level, signal combining means having a first input connected to an output of said comparing means, and means for controlling a gain of an AGC amplifier and/or an opening of an iris in accordance with an output of said signal combining means; and a flicker cancelling loop connected to said output of said image pickup device including a third image pickup signal level detecting means and a flicker component filter connected to an output thereof for detecting a flicker component level in the image pickup output signal and producing a flicker cancellation signal fed to a second input of said signal combining means, said means for controlling the gain of the AGC amplifier and/or the opening of the iris outputting a control signal from which the flicker component level is cancelled, wherein said exposure control loop and said flicker cancelling loop are independent systems.

5. An apparatus according to claim 4, wherein said flicker cancelling loop comprises a band pass filter having a pass band corresponding to a frequency of the flicker components which is determined by the relation between a frequency of a commercially available power source and a filed frequency of a television system.

6. An apparatus according to claim 4, wherein said third image pickup signal level detecting means detects the flicker component level by using the image pickup signal of a whole image pickup picture plane.

7. An apparatus according to claim 4, wherein the detection of said back-light state and the front-light state is performed in response to a luminance signal derived from said first exposure detection area and a luminance signal derived from said second exposure detection area.

8. An apparatus according to claim 7, wherein a luminance distribution state is determined from said luminance signals by counting the number of samples of luminance signal data whose levels are equal to or higher than a predetermined level.

* * * * *